June 27, 1933.     J. F. CAVANAGH     1,916,167
STEERING GEAR STABILIZER
Filed Dec. 17, 1928

INVENTOR
John F. Cavanagh
BY
Barlow & Barlow
ATTORNEY

Patented June 27, 1933

1,916,167

UNITED STATES PATENT OFFICE

JOHN F. CAVANAGH, OF PROVIDENCE, RHODE ISLAND, ASSIGNOR TO MICHAEL ROMANO, OF PROVIDENCE, RHODE ISLAND

STEERING GEAR STABILIZER

Application filed December 17, 1928. Serial No. 326,476.

This invention relates to an improved construction of automobile steering gear stabilizing device; and has for its principal object to provide a device for steadying the steering gear of the vehicle thereby preventing the front wheels from wobbling or what is commonly known as "shimmying".

Another object of the invention is to provide a device of this character which is of simple and inexpensive construction and one which may be readily applied to practically any make of car.

Another object is to provide a device which may be readily applied without the use of tools.

My present invention is of that class which utilizes both the rearward stress and the endways friction drag principle on the steering cross rod.

With these and other objects in view, the invention consists of certain novel features of construction, as will be more fully described, and particularly pointed out in the appended claims.

Figure 1:
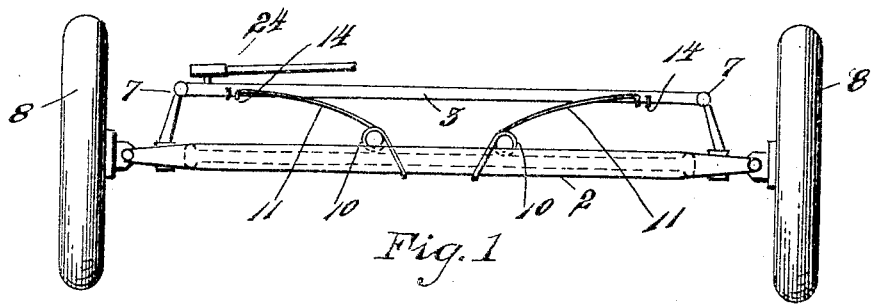
Fig. 1 is a plan view showing my improved device applied to the steering gear of an automobile.
Figure 2:
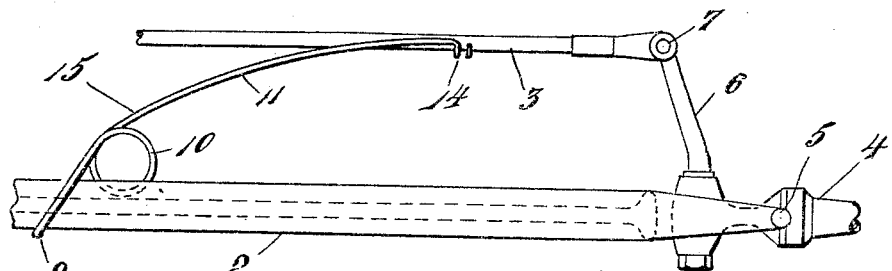
Fig. 2 is an enlarged portion of the steering gear and front axle with the steadying device applied.

It is found in practice that certain parts of the steering mechanism of automobiles quickly wear and so permit a wabbling motion of the wheels which are mounted on knuckles pivoted to the opposite ends of the forward axle, which steering knuckles are connected by a cross-rod so that the wheels may be swung in unison to direct the course of the vehicle. It is also found in practice that the vibrations of one wheel upon being transmitted thru this cross-rod serve to impart similar vibrations to the opposite wheel and that where both wheels vibrate in unison a wabbling or so-called "shimmying" action or motion is imparted to the vehicle, but if the cross-rod is frictionally held against a free endways movement, this shimmying motion is prevented and in order to accomplish this stabilizing effect in a simple and effective way, I have provided a stabilizing device which is formed from a length of wire folded upon itself to straddle and embrace the axle of the vehicle, the free ends of the arms being arranged to extend outwardly to press against the steering cross-rod and exert a frictional resistance to the free endways movement of the rod and so steady and prevent a wabbling action of the steering mechanism.

With reference to the drawing, 2 designates the usual vehicle axle which is herein shown as being of the usual I-beam type and to each end of this axle a steering knuckle 4 is pivoted at 5. Each knuckle is provided with an arm 6 set at substantially a right angle to the axis of the wheel, and a connecting cross rod 3 is pivoted at its opposite ends at 7 to these arms 6 thereby connecting these steering knuckles together; a steering motion is imparted to this cross rod and knuckles thru the steering rod 24 and steering hand wheel (not shown).

In order to prevent vibration of one wheel 8 from being freely transmitted thru this cross-rod 3 to the opposite wheel, I have mounted a stabilizing device 15 to exert sufficient frictional resistance to the endwise movement of this rod 3 to prevent the transmission of vibrations from one wheel 8 to the other but without interfering with the steering of the vehicle.

One form of stabilizer for exerting this frictional resistance is that of a resilient lever formed of a length of wire folded upon itself at its middle providing a bridge portion 9 of a length substantially that of the width of the axle against which it is set, the bridge having a pair of elongated resilient side arms 11 arranged to embrace the axle and each is provided with a coil 10 formed a short distance from the bridge 9 and laterally inset towards each other and positioned to set into the channel in the opposite side of the axle to prevent lateral disengagement of the device from the axle and provide a fulcrum for the extremities of the arms 11 which are preferably curved into hook shape as at 14 to engage and exert a frictional pressure on the cross-rod 3.

As the hooked ends 14 are snapped over the cross-rod 3 against the spring action of the coils 10, it will be seen that there is a binding action exerted between the bridge 9 and coils 10 upon the front axle which serves to hold the stabilizer in place causing it to grip the axle and resist any tendency to slide along the same. Also it will be understood that the device exerts a constant rearward pressure against the steering cross rod 3, which also assists in preventing the vibration from one wheel being transmitted thru the steering linkage to the other wheel, while the hooked ends 14 in pressing against the cross-rod 3 provide a friction drag which resists a free longitudinal movement of the said cross-rod and so stabilize the action of the mechanism.

As the binding or gripping action of the device upon the front axle is far greater than the friction grip upon the cross-rod, the device remains upon that portion of the front axle where first applied.

It will be noted that advantage is taken of the channel in the axle to form a retainer for the coils 10 and thus prevent their lateral displacement and also serves to lock the whole device to the axle.

Any desired number of my stabilizing devices may be employed on each axle according to the demands of each particular case but in practice I preferably employ and mount them as far apart as practicable rather than in the center of the cross-rod thereby eliminating any tendency to deflect or buckle the cross-rod thru excessive strain applied to the middle, and furthermore I apply the device at points most effective for taking up lost motion in the various joints.

Figure 5:
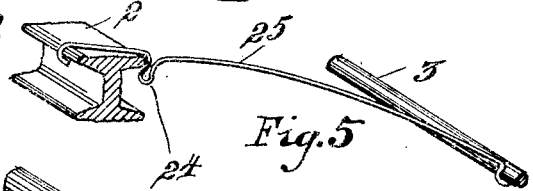
Fig. 5 is a perspective view showing a modification of my improved stabilizer as being formed with a single arm instead of having a pair of arms as illustrated in the other figures.
Figure 3:
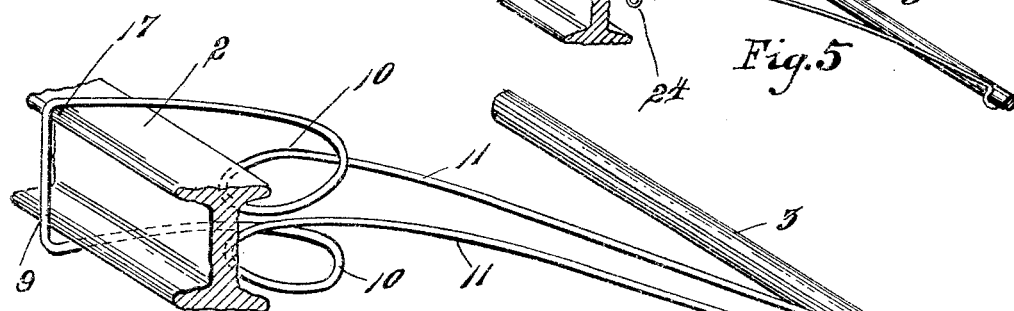
Fig. 3 is a perspective view of my improved device with those portions of the axle and cross rod which are engaged by the device.

I have herein shown the device as being provided with a coil in each of the arms but where the device is formed of a stiffer wire the coils may be omitted and the arms inset laterally to form fulcrumed shoulders 24 to hook over or engage the edge of the axle in the manner shown in Fig. 5, which illustrates a single arm 25 as performing the stabilizing function instead of the pair of arms illustrated in the other figures of the drawing.

My improved construction enables a person to apply these devices very easily, without the use of tools and the device is effective for overcoming the tendencies of the front wheels to wobble.

Figure 4:
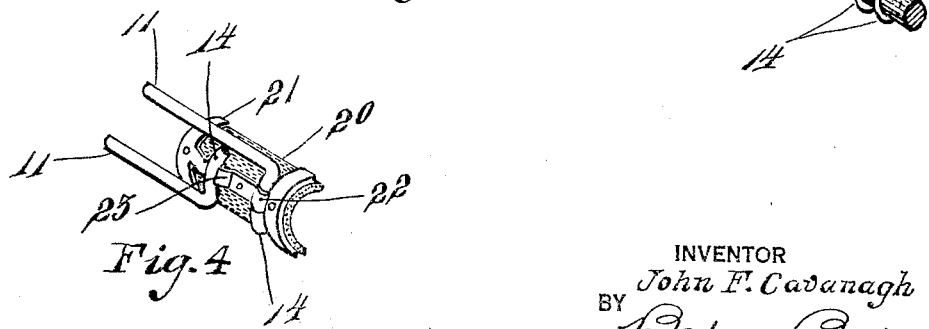
Fig. 4 is a perspective view of a friction shoe which may be mounted upon the ends of the two arms of the stabilizer to provide added frictional resistance to the endways movement of the steering cross rod.

With reference to Fig. 4, 20 designates a piece of friction fabric similar to what is commonly known as brake lining and 21 is a metal support riveted to the fabric and formed to hold the fabric in conformity with the cylindrical surface of the cross-rod against which it is designed to rest and also retain the ends 14 of the stabilizer as shown.

It will be seen that in utilizing this friction shoe I preferably attach one of the arms of the stabilizer permanently to the shoe as at 22 and provide a notch or retaining groove in the support 21 for the other arm, as shown at 23.

My stabilizing device can be readily applied to practically all makes of automobiles and is not affected by the various brake mechanisms and linkages, as most cars are similar with respect to the front axle and the cross rod.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a motor vehicle, an axle grooved in one face, steering knuckles pivoted to the ends of said axle, a steering cross-rod connecting said knuckles, a stabilizer formed of a length of wire folded at its middle upon itself providing a bridge with elongated resilient arms, said arms being arranged to straddle the axle with its bridge lying against one side thereof, and a coil being formed in each arm inset to lie in the groove of the axle and the free ends of the arms extending to exert sliding resilient frictional engagement with said cross-rod.

2. In combination with an automobile front axle having a channel recess at its rear side, steering knuckles at the ends of the axle and a connecting rod back of the axle connecting said knuckles, of a device made of spring wire disposed between said axle and steering rod, said device having a substantially U-shaped portion embracing the axle and bearing thereagainst at its front side and at an edge, a spring coil coiled inwardly and seated in the channel recess of said axle, a side extending from said coil to the connecting rod and detachably engaging thereagainst at its end, said side being sprung to curved form thereby to cause the axle engaging part of the device to grip the axle and cause said device to press against the connecting rod.

In testimony whereof I affix my signature.

JOHN F. CAVANAGH.